United States Patent [19]

Johnson et al.

[11] 4,292,293

[45] Sep. 29, 1981

[54] METHOD FOR THE OXIDATION OF WATER-SOLUBLE SULFIDE COMPOUNDS TO HIGHER OXIDATION STATES

[75] Inventors: Donald A. Johnson, Bolingbrook; Baker N. Nimry, Downers Grove, both of Ill.

[73] Assignee: Nalco Chemical Company, Oak Brook, Ill.

[21] Appl. No.: 172,608

[22] Filed: Jul. 28, 1980

[51] Int. Cl.$^3$ .......................... C02F 1/76; C01B 17/06
[52] U.S. Cl. .................................. 423/571; 210/758; 210/759; 423/DIG. 13
[58] Field of Search ............... 423/224, 226, 571, 574, 423/575, 514; 210/701, 758, 759

[56] References Cited

U.S. PATENT DOCUMENTS

| | | | |
|---|---|---|---|
| 1,792,097 | 2/1931 | Jacobson | 423/571 |
| 3,907,972 | 9/1975 | Stautzenberger | 423/575 |
| 4,083,944 | 4/1978 | Chalmers | 423/574 |

FOREIGN PATENT DOCUMENTS

614685   2/1961   Canada ................................ 210/701

*Primary Examiner*—G. O. Peters
*Attorney, Agent, or Firm*—John G. Premo; Robert A. Miller

[57] ABSTRACT

An improved method for the oxidation of water-soluble inorganic sulfide ions in aqueous systems is disclosed. The method uses a soluble metallic ion catalyst in the presence of an oxidizing agent. The improvement comprises adding to the system a water-soluble anionically-charged polymer having a molecular weight of from 1,000–100,000. Additionally, certain organic phosphonate materials can be used in combination with the polymer.

By the use of the polymer or polymer-phosphonate treatment the efficiency of the metallic ion catalyst and the sulfide oxidation step is improved.

11 Claims, No Drawings

METHOD FOR THE OXIDATION OF WATER-SOLUBLE SULFIDE COMPOUNDS TO HIGHER OXIDATION STATES

Sulfide ion is a naturally occurring species found in many subterranean waters. This material is highly corrosive whether it be in gaseous form as hydrogen sulfide or as an alkali or alkaline earth metal. The conversion of sulfide to sulfur materials containing higher oxidation states is particularly important in the petroleum industry and in processes where electricity is generated from geothermal steam sources in order to minimize environmental effects. The art has shown that various metallic salt systems can be added to aqueous or gaseous systems containing sulfide to catalyze the oxidation of sulfide to higher oxidation states utilizing oxidizing agents, including peroxides, oxygen, chlorine or other well known oxidizing agents to form sulfur materials which can be disposed of more readily. While iron in the ferrous form and particularly ferrous sulfate is known to catalyze the oxidation of sulfide ion to higher oxidation states an improvement in the catalytic activity of metallic ion and particularly ferrous ion for this reaction would be an advance to the art.

This invention is particularly directed to a method for improving the sulfide oxidation process and particularly, this invention discloses a method for the use of polyanionic dispersants to improve the efficiency of metallic ion and especially ferrous and/or ferric catalysts for the oxidation of sulfide by hydrogen peroxide and/or oxygen. Ionic polymers such as those described in this application have been found to both increase the catalytic effect of iron and improve the stoichiometric efficiency of the oxidation of sulfide by hydrogen peroxide and/or oxygen.

The early work of Krebs, H. A. Biochim A., 204, 343–346 (1929) showed the effect of pH and transition metal cations on the rate of uptake of oxygen by sulfide-containing solutions. The catalytic effect of part per million quantities of divalent copper and manganese ions was noted to be exceptionally strong. Chen and Morris (Chen, K. Y., and Morris, J. C., "Oxidation of Aqueous Sulfide by $O_2$: 1. General Characteristics and Catalytic Influences," presented at the Fifth International Water Pollution Research Conference, July–August, 1970) expanded on this work and studied the effects of various other cations and organic molecules on oxygen uptake. They found the order of catalytic activity to be:

$$Ni > Co > Mn > Cu > Fe > Ca \text{ or } Mg$$

Hoffmann (Hoffmann, M. R., "Kinetics and Mechanism of Oxidation of Hydrogen Sulfide by Hydrogen Peroxide in Acidic Solution," Environmental Science and Technology V. II, No. 1, January, 1977, pp. 61–66) reported on the kinetic characteristics of the oxidation of sulfides by hydrogen peroxide. They noted that the stoichiometry of the reaction depended on experimental conditions and their effect on the final reaction products. For example, oxidation to free sulfur requires less peroxide than does oxidation to thiosulfate, with a whole spectrum of oxidation states available as the reaction products.

Castrantas (Castrantas, H. M., "The use of Hydrogen Peroxide to Abate Hydrogen Sulfide in Geothermal Operations," presented at 1979 SPE of AIME International Symposium on Oilfield and Geothermal Chemistry, Houston, Tex., Jan. 22–24, 1979) studied the stoichiometry of the iron-catalyzed oxidation of hydrogen sulfide by hydrogen peroxide. He concluded that the oxidation reaction of $H_2S$-$H_2O_2$ was catalyzed by iron in a similar manner to that of the $O_2$-$H_2S$ reaction.

Roberts, Johnson and Miller in U.S. Pat. No. 3,622,273 hereinafter incorporated by reference, reported a method for improving the effectiveness of iron as a catalyst for the oxygen oxidation of hydrogen sulfide by using the chelating agent, NTA. They note that the pH of the absorbent solution must be held in a range in which the iron complexes remain soluble. They postulate a reaction sequence as follows:

$$2Fe^{3+} + H_2S \rightarrow 2Fe^{2+} + 2H^+ + S$$

$$2Fe^{2+} + 2H^+ + \tfrac{1}{2}O_2 \rightarrow 2Fe^{3+} + H_2O$$

The subject invention differs from that of Roberts, Johnson and Miller in that the preferred additives are polyionic dispersants rather than chelants. We propose that the mode of action of these dispersants is through reduction of the particle size of the precipitated iron species and the resulting increase in surface area of the catalytic iron compounds. A specific sequence of reactions might be:

$$2FeS + H_2O_2 + S^- \rightarrow Fe_2S_3$$

$$2Fe_2S_3 \rightarrow 2FeS + S°$$

The action of the dispersant additives is to keep the particles of FeS and $Fe_2S_3$ suspended and to maximize their surface area.

This catalytic method should be applicable to both the oxygen and hydrogen peroxide sulfide oxidation processes.

The additives of this invention are generally classified as water-soluble polymers having molecular weights of approximately 1–100,000, which are anionically charged. Materials of this type are generally well-known to the art and include polyacrylic acid and its alkali metal and/or ammonium salts, copolymers of acrylic acid with either ionic or anionic comonomers including acrylamide, sodium vinylsulfonate, maleic anhydride, methylacrylate, ethylacrylate, methacrylamide, etc. Also useful and in fact one of the preferred polymers useful in this invention is a hydrolyzed polyacrylonitrile having the above-mentioned molecular weight range.

The polymeric materials described above are water-soluble and are generally prepared by copolymerizing in aqueous solution the desired monomer mixture. Either red-ox or conventional-free radical polymerization methods may be utilized. A particularly preferred method for the preparation of copolymers of this type is described in U.S. Pat. No. 4,143,222, which describes a continuous tube reactor, which is hereinafter incorporated by reference. Polyacrylonitrile, which is water insoluble may be produced by polymerizing acrylonitrile monomer in emulsion form in aqueous solution followed by adding a base to the aqueous solution and heating as desired to obtain the desired degree of hydrolysis and obtain the desired ratio of both amide and carboxyl formationalities. A method for the preparation of hydrolyzed polyacrylonitrile is described in U.S. Pat.

No. 3,549,548, which is hereinafter incorporated herein by reference.

The polyionic additives are generally added to the sulfide-containing water to be treated at a level of from 5–1,000 ppm as active polymer based upon the total quantity of fluid involved. This figure will, of course, tend to vary with the amount of sulfide present in the aqueous fluid with more material being utilized at higher sulfide levels. In a preferred embodiment of this invention from 20 to 500 ppm of the polyanionic additive is added as active polymer to the sulfide-containing fluid.

In order to test the effectiveness of the polyanionic materials of this invention in a sulfide oxidation process, several tests were conducted. The apparatus used for this work was a Mettler automatic titrator. The titration system was set up to use a pH sensor, red-ox potential sensor, two rate controllers and two burette drives. Sodium hydroxide was added by one of the burettes to keep the test solution close to the nominal pH±0.2 unit. The second burette was utilized to add hydrogen peroxide to the test solution to maintain a constant red-ox potential±5 mv. The solution was held at constant temperature by a 600 ml Jacketed Cell connected to a recirculating constant temperature bath. With this set-up the reactor temperature was controlled at 50°±1.0° C. The solution in the cell was blanketed with nitrogen during each trial to prevent any oxygen interferences from the surrounding air. The quantity of hydrogen peroxide added was measured by the output of the hydrogen peroxide burette connected to the chart drive y-axis, while the x-axis recorded the time of reaction. The solution was stirred by a magnetic stirrer. Sulfide was determined utilizing a specific ion electrode.

Based upon the data obtained above, hydrogen sulfide residual in milimolar units can be calculated. The results as indicated in Tables 1–7 below show the effect of various polymers useful in the subject invention.

TABLE 1

Rate Constant = .0139
Additive level = 0
Iron level = 0
E = −324 mv

| TIME (mins.) | $H_2S$ Residual m moles |
|---|---|
| 1.0 | 4.5368 |
| 5.0 | 4.1029 |
| 10. | 3.5588 |
| 15. | 3.2132 |
| 25. | 3.1471 |
| 35. | 2.5736 |
| 55. | 1.9779 |
| 75. | 1.5294 |
| 85. | 1.3162 |

TABLE 2

Rate Constant = .0232
Additive = none
Additive level = 0
Iron = 42 ppm
E = −324 mv

| TIME (mins.) | $H_2S$ Residual m moles |
|---|---|
| 1.0 | 2.8897 |
| 5.0 | 2.4632 |
| 10. | 2.1838 |
| 15. | 1.8456 |
| 25. | 1.4191 |
| 35. | 1.1029 |
| 45. | 0.9559 |
| 60. | 0.7353 |

TABLE 3

Rate Constant = .0235
Additive level = 88 ppm (as active polymer)
Iron = 42 ppm
E = −324 mv

| TIME (mins.) | $H_2S$ Residual m moles |
|---|---|
| 1.0 | 3.0294 |
| 5.0 | 2.5809 |
| 10.0 | 2.4559 |
| 15. | 2.1618 |
| 25. | 1.6912 |
| 35. | 1.2427 |
| 45. | 1.1691 |
| 60. | 0.7112 |

Additive - Aqueous solution of hydrolyzed polyacrylonitrile prepared according to U.S. Pat. No. 3,549,548 This sample was a commercial material typically having a molecular weight of 33,000.

TABLE 4

Rate Constant = .111
Additive level = 109 ppm (as active polymer)
Iron = 42.3 ppm
E = −324 mv

| TIME (mins.) | $H_2S$ Residual m moles |
|---|---|
| .52 | 3.6668 |
| 1.18 | 2.935 |
| 3.15 | 2.2609 |
| 5.75 | 1.895 |
| 7.42 | 1.6632 |
| 11.18 | 1.2618 |
| 15.33 | 0.7662 |
| 18.08 | 0.5465 |
| 23.67 | 0.2497 |
| 28.23 | 0.1438 |

Additive - Aqueous solution of polyacrylic acid, molecular weight 2100

TABLE 5

Rate Constant = .193
Additive level = 325 ppm (as active polymer)
Iron = 42.3 ppm
E = −324 mv

| TIME (mins.) | $H_2S$ Residual m moles |
|---|---|
| .58 | 3.7747 |
| 1.32 | 2.5129 |
| 2.08 | 1.7929 |
| 3.4 | 1.3394 |
| 4.75 | 0.7082 |
| 7.77 | 0.2571 |
| 12.17 | 0.1574 |
| 16.17 | .0794 |
| 21.57 | .0771 |

Additive - Aqueous solution of polyacrylic acid, molecular weight 2100

TABLE 6

Rate Constant = .194
Additive level = 975 ppm (as active polymer)
Iron = 42.3 ppm
E = −324 mv

| TIME (mins.) | $H_2S$ Residual m moles |
|---|---|
| .5 | 5.2082 |
| 1.25 | 2.4315 |
| 1.85 | 2.1838 |
| 2.73 | 1.9612 |
| 4.75 | 1.6953 |
| 6.0 | 1.4538 |
| 8.92 | 0.8238 |

TABLE 6-continued

| | |
|---|---|
| 12.75 | 0.3132 |
| 18.27 | 0.1094 |

Additive - Aqueous mixture containing 30.0% by weight of a 65% aqueous solution of a polyacrylic acid having a molecular weight of 2,100 and approximately 7.5% by weight of a 60% aqueous solution of hydroxyethylidene-diphosphonic acid

TABLE 7

Rate Constant = .082
Additive level = 100 ppm (as active polymer)
Iron = 42.3 ppm
E = −324 mv

| TIME (mins.) | $H_2S$ Residual m moles |
|---|---|
| .48 | 3.28 |
| 1.1 | 3.0612 |
| 1.8 | 2.7918 |
| 3.25 | 2.5074 |
| 5.92 | 2.2347 |
| 9.67 | 1.8165 |
| 12.92 | 1.5459 |
| 21.77 | 0.7747 |
| 31.07 | 0.2071 |

Additive - A 20% aqueous solution of an acrylamide (75 weight %) acrylic acid (25 weight %) copolymer having a molecular weight of approximately 10,000

If this data is plotted utilizing the natural logarithm of the sulfide concentration in milimolar units vs. time the data gives a good fit to a straight line. This indicates that under the conditions of the experiment the reaction is first order to sulfide concentration. The equation that determines the rate of a first order reaction is $$-\frac{d[\Sigma S]}{dt} = K[\Sigma S]$$

which may be rearranged to $$-\frac{d[\Sigma S]}{[\Sigma S]dt} = K$$

which is equivalent to $$-\frac{dLn[\Sigma S]}{dt} K.$$

The slope of a curve representing the log of the sulfide concentration vs. time is equal to the negative of the rate constant. This method was used to determine the rate constants reported in Tables 1–7. While this analysis ignores the effects of red-ox potential including sulfide concentration, catalyst effect and temperature, it is suggested that the constants are conditional and will vary with these factors. The only variation stated in Tables 1–7 were the presence of iron and the dispersant additives selected. The effect of the iron as a catalyst is reflected in the rate constants determined for each experiment.

The experiments detailed in Tables 1 and 2 show the effect of iron alone where the rate constant is almost doubled by the addition of 42 ppm of ferrous iron. Addition of 88 ppm of hydrolyzed polyacrylonitrile having a molecular weight of approximately 33,000, has only a minimal effect on the catalytic activity of the iron. A polyacrylic acid having a molecular weight of 2,100 at a rate of 109 ppm showed a 5× increase in the rate of reaction and an even greater increase when utilized at 325 ppm. A mixture of the same homopolymer and hydroxyethylidine-diphophonic acid as seen in Table 6, gave an effect at 97.5 ppm polymer and 2.25 1-hydroxy ethylidene 1,1-diphosphonic acid which was midway between two dosages of the polymer alone. Finally, in Table 7 the effect of a acrylamide-acrylic acid 75 to 25 weight percent copolymer having a molecular weight of 10,000 was examined at a level of 100 ppm. As the rate constant indicates, this material is also effective in the catalytic oxidation of sulfide to higher species.

While as indicated and shown above, the anionic materials have utility in increasing the rate of sulfide oxidation utilizing various iron catalysts, it is surmised and expected that the additives will also find utility when other metal ion catalysts proposed for the oxidation of sulfide iron are utilized. These additives include nickel, cobalt, magnesium, copper, calcium ions. While the date shown above for hydrolyzed polyacrylonitrile shows minimal effect, commercial usage of this material has shown it to perform satisfactorily.

It is noted that the above data while showing the effect of the anionically water charged water-soluble polymers also shows substantial activity when the polymers are used in combination with organic phosphonate type materials. When phosphonate type dispersants are used in combination with the polymers of this invention a further surprising increase in activity results. These organic phosphonates are generally represented by members of the class including amino trimethylene phosphonic acid, 1-hydroxy ethylidene 1,1-diphosphonic acid, hexamethylenediaminetetramethylene phosphonic acid, tetraethylenepentamine, tetramethylene phosphonic acid, diethylenetriamine, pentamethylene phosphonic acid, 2-phosphono butane-1,2,3,4, tetracarboxylic acid, 1,2-phosphono butane, 1,2,4-tricarboxylic acid, etc. A preferred material for use in this invention is 1-hydroxyethylidene 1,1-diphosphonic acid. While only the phosphonate form has been described above it should be recognized that the phosphonates described above can also be used in their water-soluble alkali metal and ammonium salt forms. The organic phosphonate material is generally used at a ratio of water-soluble polymer, to phosphonate of 1:1 to 1:50. While only the activity of 1,hydroxyethylidene 1,1-diphosphonic acid has been shown above, this member is believed to be typical of the group described above and the other members of the group should perform in an equivalent manner.

Having thus described our invention we claim:

1. An improved method for the oxidation of water-soluble inorganic sulfide ions found in aqueous systems to higher oxidation states which method utilizes a metallic ion catalyst selected from the group consisting of nickel, cobalt, magnesium, copper and iron in the presence of an oxidizing agent selected from the group consisting of oxygen, hydrogen peroxide and chlorine, the improvement comprising adding to the aqueous system a water-soluble anionically charged polymer having a molecular weight of from 1,000–100,000 in an effective amount to improve the efficiency of the metallic ion catalyst.

2. The improvement of claim 1 wherein the metallic iron catalyst is in the ferric state.

3. The improvement of claim 1 wherein the metallic catalyst is ferrous sulfate.

4. The improvement of claim 1 wherein the metallic iron catalyst is in the ferrous state.

5. The improvement of claim 1 wherein the oxidizing agent compound is hydrogen peroxide.

6. The improvement of claim 1 wherein the water-soluble anionically charged polymer is selected from the group consisting of polyacrylic acid, polymethacrylic acid, acrylic acid, acrylamide copolymers, acrylic acid-methylacrylate copolymers, hydrolyzed polyacrylonitrile, and water-soluble salts thereof.

7. The improvement of claim 6 wherein the water-soluble anionically charged polymer is hydrolyzed polyacrylonitrile.

8. The improvement of claim 6 wherein the water-soluble anionically charged polymer is polyacrylic acid having a molecular weight of approximately 2,100.

9. An improved method for the oxidation of water-soluble inorganic sulfide ions found in aqueous systems to higher oxidation states, which method utilizes a metallic ion catalyst selected from the group consisting of nickel, cobalt, magnesium, copper and iron in the presence of an oxidizing agent selected from the group consisting of oxygen, hydrogen peroxide and chlorine, the improvement comprising adding to the aqueous system an anionically-charged water-soluble polymer having a molecular weight of from 1,000–100,000 in combination with an organic phosphonate selected from the group consisting of amino trismethylene phosphonic acid, 1, hydroxyethyidene 1,1-diphosphonic acid, hexamethylene-diaminetetramethylene phosphonic acid, in an effective amount to improve the efficiency of the metallic ion catalyst.

10. The method of claim 9 wherein the anionically charged water-soluble polymer and the organic phosphonate material are used at weight ratios of from 1:1 to 50:1.

11. The method of claim 9 wherein the organic phosphonate is 1,1,-hydroxyethylidene diphonphonic acid.

* * * * *